UNITED STATES PATENT OFFICE.

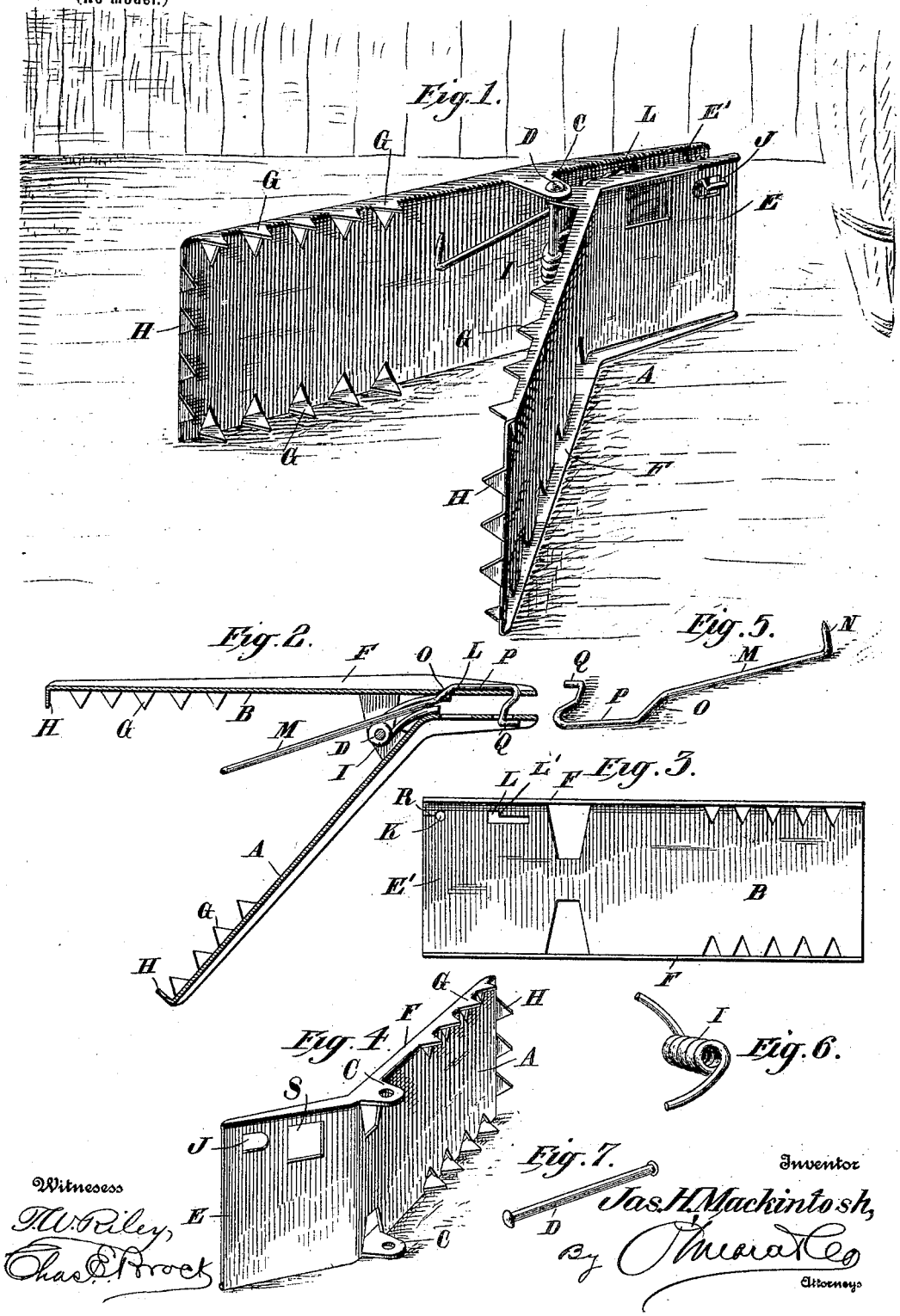

JAMES H. MACKINTOSH, OF ASBURY PARK, NEW JERSEY.

ANIMAL-TRAP.

SPECIFICATION forming part of Letters Patent No. 622,700, dated April 11, 1899.

Application filed October 7, 1897. Renewed August 27, 1898. Serial No. 689,704. (No model.)

*To all whom it may concern:*

Be it known that I, JAMES H. MACKINTOSH, residing at Asbury Park, in the county of Monmouth and State New Jersey, have invented a new and useful Animal-Trap, of which the following is a specification.

My invention is in the nature of an animal-trap, and has for its object to provide a device of this class which shall be simple, cheap, and durable and while constructed of few inexpensive parts will be more effective in operation than many complicated and costly devices now in common use.

A further object of my invention is to provide an animal-trap so constructed that in approaching it the animal is not liable to be deterred or frightened away by having to enter a hole or tread upon some part of the trap.

A further object of my invention is to provide a device of this class in which the animal is permitted to approach the bait without leaving the floor or carpet of the room in which the trap is set.

With these and other objects in view my invention consists in an animal-trap comprising two sheet-metal jaws having teeth formed of the material thereof, inwardly-projecting lugs through which the pivotal pin passes, and rearward extensions beyond the pivotal pin, the rearward extension of one jaw being in line therewith and the other at an obtuse angle thereto, a spring coiled around the pivotal pin and bearing outwardly between the rear extensions of the jaws, and a set and trigger mechanism between the extensions and jaws.

My invention further consists in the improved construction, arrangement, and combination of parts hereinafter fully described and afterward specifically pointed out in the claim.

In order to enable others skilled in the art to which my invention most nearly appertains to make and use the same, I will now proceed to describe its construction and operation, having reference to the accompanying drawings, forming part of this specification, in which—

Figure 1 is a perspective view illustrating my improved animal-trap set and in position for practical operation. Fig. 2 is a horizontal section through the same. Fig. 3 is a view in elevation of the outside of one of the jaws and its rearward extension. Fig. 4 is a detail perspective view of the inside of the other jaw and its extension. Fig. 5 is a detail perspective view of the trigger and set-bar. Fig. 6 is a detail perspective view of the spring. Fig. 7 is a detail perspective view of the pivot-pin.

Like letters of reference mark the same parts wherever they occur in the various figures of the drawings.

Referring to the drawings by letters, A and B are the two jaws of my improved trap for catching rats and other animals, each of said jaws being provided with inwardly-bent edge lugs C, which receive the pivot-pin D, by which the two jaws are hinged or pivoted together. The jaw A is provided with an extension E to the rear of the pivot-pin, bent at an obtuse angle to the jaw itself, while the jaw B is provided with a similar extension E' beyond the pivot-pin, lying in line with the jaw itself. Each of the jaws has flanges F bent outward at its edges, said flanges extending also along the extensions E and E' of the jaws. At the junction of these flanges with the body of the jaws teeth G are punched inward out of the material of the jaw itself, while at the outer end of each jaw similar teeth H are formed and bent inward. A wire spring I of considerable strength is coiled about the pivot-pin D, with its ends bearing outwardly on the inside of the extensions E and E' of the jaws, its normal tendency being to bring the jaws together by forcing the extensions outward. The extension E of the jaw A is provided near its upper edge with an opening J, and the extension E' of the jaw B is provided near its upper edge with a small circular opening K and an L-shaped slot L. The wire trigger M is provided with a bend N upon which to impale the bait, which when the trap is set, as in Figs. 1 and 2, is located in the proper position between the jaws to be easily reached by the animal and extends backward, being bent slightly outward at O and passed through the L-shaped slot L, from whence it extends rearwardly at P on the outside of the extension E' of the jaw B and is passed through the opening K. After passing through this opening it is bent inwardly and provided with a hooked end Q, which when the trap is set is passed through an opening J in the extension E of the jaw A and hooks over the edge of said opening, serving to hold the jaws distended, the bend O of the trigger being at this time located in the small upper portion of the L-shaped slot and resting on shoulder L' of same. (See Fig. 3.) When, however, the bait is agitated by the animal, this bend O drops out of the small portion of the L-shaped slot L into the main body thereof, which loosens the whole trigger-wire, so that the toe or hook Q will pass through the slot J of the jaw A and permit the spring I to throw the jaws violently together.

It will be noticed that the trap rests upon the floor or carpet and that the animal in approaching it is not compelled to thrust his head in a hole or walk upon any part of the trap, both of these operations having a tendency to frighten the animal away from the trap. With my trap, however, the animal approaches the bait directly upon the surface upon which the trap is set and may seize the bait without being deterred by any of the difficulties named. The bait may be attached directly to the hook N or may be suspended therefrom by thin wire. It will be further noticed that the trap is very cheaply made. Each of the jaws, including the teeth and the pivotal lugs, may be stamped in a single operation from a piece of ordinary sheet metal, the one operation providing it with teeth, lugs, flanges, and the necessary openings. The other parts of the trap are simply three pieces of ordinary wire, one of which is the pivot, another the spring, and the third the trigger and set-bar. The jaws having been made and the trigger and set-bar properly bent, the parts of the trap may be assembled by unskilled labor, the whole trap being producible at a very low cost, while being extremely durable and effective in operation and not liable to get out of order or be broken with ordinary use. No skill is required to set the trap, the operation being easily and quickly done by adjusting the bend O of the trigger into the small portion of the slot L, as before described. The long leverage of the trigger renders the release thereof certain at the slightest touch of the bait. Owing to the peculiar form of the trigger-bar at its rear end and the location of the trigger-holes in the extensions of the jaws all strain due to the holding of the jaws apart against the force of the spring is borne here by the trigger and the material around the trigger-hole, the round hole through which the trigger-rod passes serving as a hinge or pivot-point for the rear bent end of the trigger. In order to pass the trigger-rod into this hole when assembling the parts, the hole is slitted or opened to the outer end of the extension E, as shown at R in Fig. 3, and one side of this slit is bent aside. After the rod has been inserted through this slit into the hole the bent side is returned to its original position to hold the rod in place. A square hole S is provided through the extension E of the jaw A, whereby the trigger may be seen while being set.

While I have illustrated and described the best means now known to me for carrying out my invention, I wish it to be understood that I do not restrict myself to the exact forms and constructions shown, but hold that any such slight changes or variations as might suggest themselves to the ordinary mechanic will properly fall within the limit and scope of my invention.

Having thus fully described my invention, what I claim as new, and desire to secure by Letters Patent of the United States, is—

The animal-trap herein described, consisting of the jaw A, having a rear extension at an obtuse angle thereto, and the jaw B having a rear extension in line with the body of the jaw, each of said jaws being stamped from sheet metal and provided with teeth and pivot-lugs stamped out of the material of the jaw, the jaw A being provided with openings J and S and the jaw B with openings K and L, the pivot-pin passing through the pivot-lugs, the spring coiled about the pivot-pin and bearing outwardly between the extensions E and E' and the trigger and set-rod M provided with a point N to receive the bait, a bent portion O to pass through the opening L and engage shoulder L' when set, and a toe Q to pass through and engage with the edge of the opening J in setting the trap, substantially as described.

JAMES H. MACKINTOSH.

Witnesses:
S. F. MACKINTOSH,
J. ALEX. MACKINTOSH.